United States Patent
Warren et al.

(10) Patent No.: US 7,227,362 B2
(45) Date of Patent: Jun. 5, 2007

(54) ELECTRIC POWER GRID INDUCED GEOPHYSICAL PROSPECTING METHOD AND APPARATUS

(76) Inventors: Roy K. Warren, 11322 Woodedge Dr., Houston, TX (US) 77065; W. Barry Weaver, 3121 Las Palmas, Houston, TX (US) 77027

( * ) Notice: Subject to any disclaimer, the term of this patent is extended or adjusted under 35 U.S.C. 154(b) by 0 days.

(21) Appl. No.: 11/088,828

(22) Filed: Mar. 24, 2005

(65) Prior Publication Data
US 2005/0184731 A1   Aug. 25, 2005

Related U.S. Application Data

(63) Continuation-in-part of application No. 10/466,322, filed on May 28, 2003.

(51) Int. Cl.
*G01V 3/00*   (2006.01)

(52) U.S. Cl. ...................................... 324/334

(58) Field of Classification Search ................ 324/335, 324/348, 334, 344, 337; 342/22, 459
See application file for complete search history.

(56) References Cited

U.S. PATENT DOCUMENTS

| | | | | |
|---|---|---|---|---|
| 2,077,707 A | * | 4/1937 | Benjamin | 342/22 |
| 3,866,111 A | | 2/1975 | Warren | 324/3 |
| 4,130,791 A | | 12/1978 | Slough et al. | 324/3 |
| 4,276,619 A | | 6/1981 | Rickenbacker | 367/13 |
| 4,295,213 A | | 10/1981 | Mifsud | 367/41 |
| 4,507,611 A | | 3/1985 | Helms | 324/323 |
| 4,646,277 A | * | 2/1987 | Bridges et al. | 340/853.5 |
| 4,686,475 A | | 8/1987 | Kober et al. | 324/349 |
| 4,751,687 A | | 6/1988 | Christensen | 367/22 |
| 4,825,165 A | | 4/1989 | Helms et al. | 324/323 |
| 4,831,331 A | * | 5/1989 | De et al. | 324/338 |
| 4,835,473 A | * | 5/1989 | Bostick, Jr. | 324/357 |
| 4,939,460 A | * | 7/1990 | Patla et al. | 324/303 |
| 5,148,110 A | | 9/1992 | Helms | 324/323 |
| 5,210,691 A | | 5/1993 | Freedman et al. | 364/422 |

(Continued)

OTHER PUBLICATIONS

McCollor, et al., "An E.M. Method for Earth Resistivity Measurements Using Power Line Harmonic Fields," 1983, Journal of Geomagnetism and Geoelectricity, vol. 35 No. 1, pp. 221-243.

(Continued)

*Primary Examiner*—Edward Lefkowitz
*Assistant Examiner*—David M. Schindler
(74) *Attorney, Agent, or Firm*—Wong, Cabello, Lutsch, Rutherford & Brucculeri, LLP

(57) ABSTRACT

An underground prospecting method and apparatus that utilizes the harmonics and fractional harmonic waves induced into the earth by the electric power grid. The data are converted to amplitude-depth and phase-depth data. The resulting data may be plotted and are compared to known patterns of the interested underground features, such as hydrocarbon, water, minerals and cavities, to identify whether the features exist and at what depth such underground features lie.

5 Claims, 6 Drawing Sheets

U.S. PATENT DOCUMENTS

| | | | | |
|---|---|---|---|---|
| 5,266,799 | A | * | 11/1993 | Steinitz et al. ............... 250/253 |
| 5,357,253 | A | * | 10/1994 | Van Etten et al. ............. 342/22 |
| 5,625,348 | A | | 4/1997 | Farnsworth et al. ......... 340/690 |
| 5,777,478 | A | | 7/1998 | Jackson ....................... 324/348 |
| 6,087,833 | A | | 7/2000 | Jackson ....................... 324/348 |
| 6,414,492 | B1 | | 7/2002 | Meyer et al. ................. 324/344 |
| 6,483,309 | B1 | | 11/2002 | Gripshover et al. ......... 324/331 |
| 6,661,235 | B2 | | 12/2003 | Rokunohe et al. ........... 324/536 |
| 6,664,788 | B2 | | 12/2003 | Hornbostel et al. .......... 324/323 |
| 6,696,839 | B2 | * | 2/2004 | Ellingsrud et al. ........... 324/337 |
| 6,754,590 | B1 | | 6/2004 | Moldoveanu ................. 702/14 |
| 2002/0024341 | A1 | | 2/2002 | Rokunohe et al. ........... 324/536 |
| 2002/0196149 | A1 | * | 12/2002 | Halleck et al. ........... 340/573.1 |
| 2004/0090234 | A1 | * | 5/2004 | Macune ....................... 324/337 |

OTHER PUBLICATIONS

Risk, et al., "*Use of Magnetotelluric Signals from 50 Hz Power Lines for Resistivity Mapping of Geothermal Fields in New Zealand*," 1999, Geophysical Prospecting, vol. 47, Issue 6, pp. 1091-1104.

Dorbin, et al., "*Introduction to Geophysical Prospecting—Fourth Edition*" McGraw-Hill Book Company 1988, pp. 3-8.

Lytle, et al. "*Using the Natural-Frequency Concept in Remote Probing of the Earth*" Radio Science, vol. 11, No. 3, pp. 199-209, Mar. 1976.

Pride, et al. Electroseismic wave properties J. Acoust. Soc. Am. 100 (3), Sep. 1996.

* cited by examiner

Data Processing
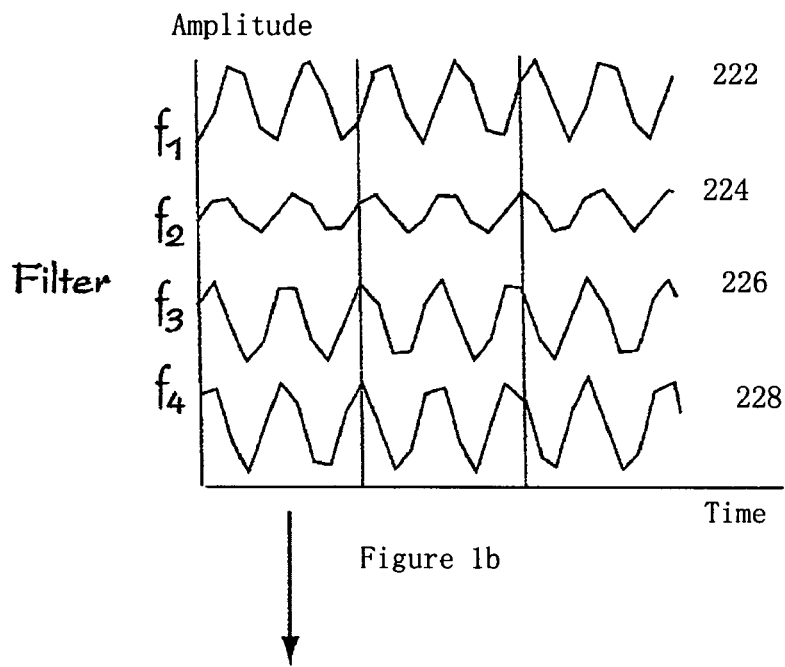
Figure 1b
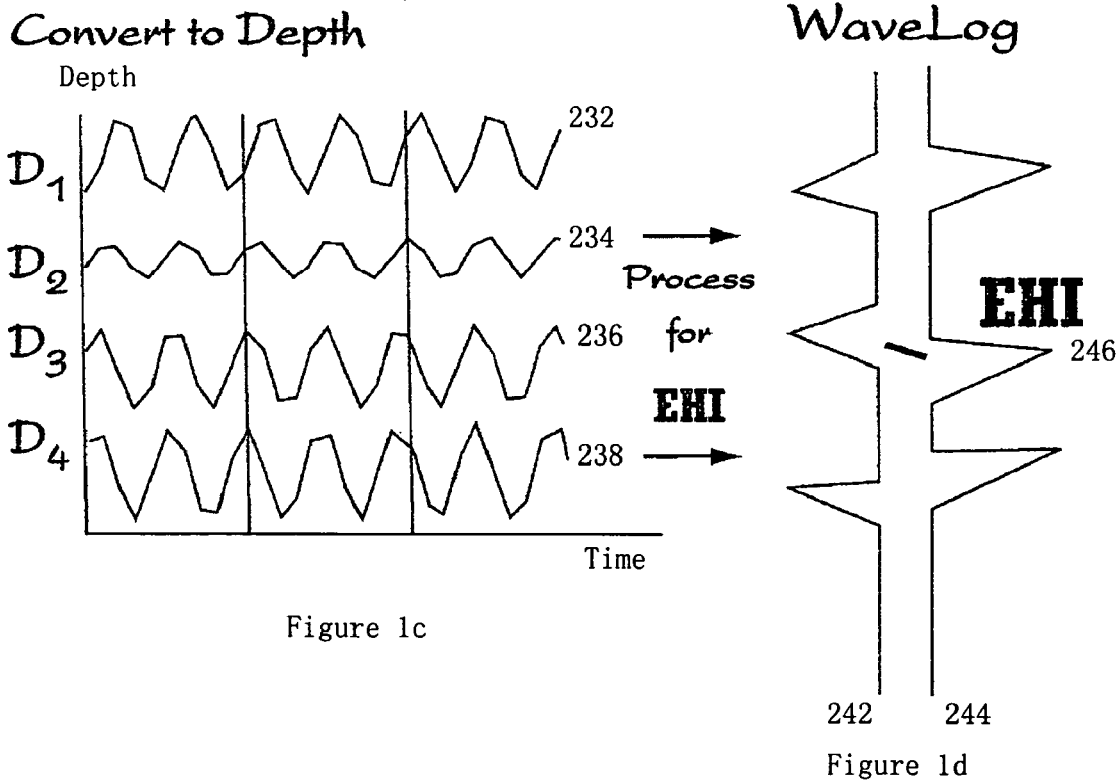
Figure 1c
Figure 1d

ELECTRIC POWER GRID INDUCED GEOPHYSICAL PROSPECTING METHOD AND APPARATUS

CROSS-REFERENCE TO RELATED APPLICATIONS

The current application is a Continuation-in-Part of a U.S. patent application by the same inventors with the same title, filed on May 28, 2003, Ser. No. 10/446,322. It is incorporated by reference herein.

BACKGROUND OF THE INVENTION

1. Field of the Invention

This invention relates to the investigation of the earths subsurface, and in particular to methods and devices that utilize electromagnetic waves produced by power line harmonics to facilitate detailed subsurface investigations.

2. Description of the Related Art

There are numerous methods used to investigate the subsurface of the earth. The most widely used methods include seismic, gravity, magnetic, electrical, and electromagnetic. Electromagnetic techniques can be broadly divided into two categories based on the source of the electromagnetic waves (Dobrin et al). Natural field sourced methods include magnetotellurics (MT) and audio frequency MT (AMT). Artificially controlled source methods include transient soundings (TEM), ground penetrating radar, and controlled source audio magnetotellurics (CSAMT). These methods all have resolution and operational characteristics, which result in limited applicability and/or high costs.

It is desirable to have methods and devices that can be used in areas where the existing methods or equipment are not suitable technically, economically or logistically. It is desirable to have methods and devices that can have wide applicability, and are simple and inexpensive to operate, and provide high resolution.

REFERENCES

Introduction to Geological Prospecting, Fourth Edition, Milton B. Dobrin and Carl H. Savit, McGraw-Hill, 1988.

"Using the natural-frequency concept in remote probing of the earth", R. J. Lytle and D. L. Lager, Radio Science, Volume 11, Number 3, pages 199-209, March 1976.

"Governing equations for the coupled electromagnetics and acoustics of porous media", S. R. Pride, Phys. Rev., B50, pages 15678-15696, 1994.

"A Recursive Time-Varying Band-Pass Filter," Z. J. Nikolic, Geophysics, Vol. 40, No.3, pages 520-526, (June 1975).

BRIEF SUMMARY OF THE INVENTION

The present invention discloses improved methods and apparatus for investigating the geologic and geophysical properties of the subsurface of the earth. One of the methods takes advantage of the sub-harmonic frequencies that are induced into the earth by electromagnetic waves from the electric power line grid. A sub-harmonic frequency is a frequency which is a fraction of a base frequency. The method utilizes the resonant tuning and filtering techniques of these sub-harmonic frequencies between the air/earth interface and the various subsurface geologic boundaries. The resonant waves are stable standing waves which can be measured repeatedly and reliably. The wave frequency is directly correlated to the depth of the reflecting surface underground. The variation in the wave properties, i.e. amplitudes and phases of waves at different frequencies may reveal the properties of the reflecting surfaces. The measurements of the standing waves are not sensitive to the altitudes of the measuring instrument, i.e. the detector may be on the ground, above ground, on a boat, a truck, a balloon or a helicopter. The reflecting surfaces (or disparity in electromagnetic properties) may be due to many different factors, such as hydrocarbon, water, mineral, cavities (man-made or natural) etc. The methods of the current invention may be used to detect any of those. These methods greatly reduce the costs for acquiring and interpreting the subsurface geology of the earth at a very high resolution. Simple devices that utilize these methods are also disclosed.

BRIEF DESCRIPTION OF THE SEVERAL VIEWS OF THE DRAWINGS

A better understanding of the invention can be had when the following detailed description of the preferred embodiments is considered in conjunction with the following drawings, in which:

FIGS. 1a-1d illustrate the basics of one embodiment of the current invention. FIG. 1a is a schematic depiction of resonant tuning in the subsurface of the earth and the major components of an apparatus used in one embodiment of the current invention. FIG. 1b depicts the data collected. FIG. 1c depicts a conversion of frequency to depth and FIG. 1d depicts one presentation using one embodiment of the current invention.

FIG. 2 shows a wave-log, a data presentation according to one embodiment of the current invention.

FIGS. 3 and 4 show comparisons of the wave-logs and electric logs for two exemplary sites, where hydrocarbon layers were found.

FIG. 5 illustrates a comparison of the wave-log and electric log for an exploration site, where salt layer was found.

DETAILED DESCRIPTION OF THE INVENTION

Figure 1A:
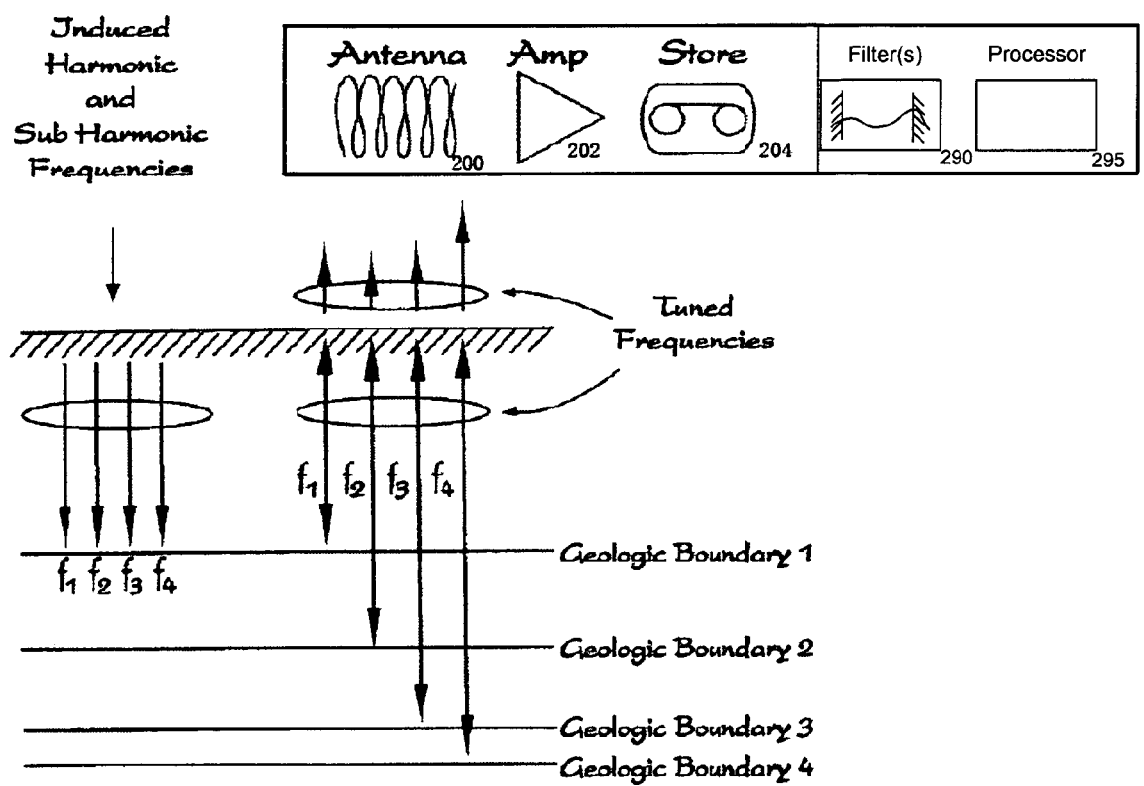

The present invention utilizes electromagnetic waves from the power line grid as an electromagnetic source for investigating the subsurface geological structure. The electric power grid induces electromagnetic waves into the earth. These electromagnetic waves consist of 60-hertz waves (50 hertz in many areas of the world) plus a rich array of harmonics and sub-harmonics. A sub-harmonic frequency is a frequency which is a fraction of a base frequency. In this application, sub-harmonics and fractional harmonics are used interchangeably. In some embodiments of the current invention, the most used sub-harmonics are the multiples of quarter harmonics. But they can be many other fractional harmonics, such as multiples of sixth harmonics. In some embodiments, the sub-harmonics include multiples of 30 and 15 hertz where the base power line frequency is 60 hertz (25, 12.5 hertz in many areas of the world where the base frequency is 50 hertz). The frequencies used can extend up to frequencies in the tens of kilohertz or higher. It has been found that finer sub-harmonics may also be used to provide the same reliable information. The finer sub-harmonics can provide better depth resolution, especially for geological features deep underground. The frequency of multiples of one thirty-second (1/32) of the power line frequency, i.e. 1.875 Hz (1.5625 Hz for 50 Hz power line frequency) has been used routinely in some embodiments. That is frequencies that are multiples of 1.875 Hz are analyzed. For example, 1.875 Hz, 3.75 Hz, 5,625 Hz, 7.5 Hz, . . . 15 Hz, 16.875 Hz, 18.75 Hz, . . . are collected and analyzed. When less resolution is needed or high frequency waves are used, some of the frequencies may be omitted. It may be equivalent of using some other sub-harmonics, such as multiples of one-sixteenth (i.e. 3.75 Hz, double of the one thirty-seconds), one-eighth (i.e. 7.5 Hz, four times of the one thirty-seconds), one-quarter (i.e. 15 Hz, eight times of the one thirty-seconds) of the power line frequency. It is believed that these continuous sources propagate to depth with the help of energy transfer of electromagnetic to acoustic and acoustic to electromagnetic between multiple stratigraphic layers (Pride). As these waves propagate they encounter various geologic boundaries. Those boundaries having dielectric and/or conductivity contrast reflect a portion of the secondary harmonic waves back to the air/earth interface. With continuous sourcing from the electric power grid, the secondary harmonics resonate between subsurface boundaries and the air/earth interface (Lytle et al). In this manner, the secondary harmonics become organized with the distance between various subsurface boundaries and the air/earth interface. This distance is normally thought of as the depth to the subsurface boundary. At resonance, the depth to the subsurface boundary is related to the wavelength of the secondary harmonic by the following formula:

$$\lambda = 2 \cdot d \quad \text{Formula 1}$$

Where $\lambda$ is the wavelength of the secondary harmonic and d is the depth to the subsurface boundary.

This relationship is illustrated in FIG. 1. Each subsurface geologic boundary is primarily resonant with a particular wavelength and therefore there exists an organization of the wavelengths with depth.

The wavelength $\lambda$ is related to frequency f as follows:

$$\lambda = \frac{v}{f} \quad \text{Formula 2}$$

Where v is the phase velocity of the electromagnetic wave in the earth. The resonance between geologic boundaries within the earth and the air/earth interface can be characterized by the following equation:

$$d = \frac{k}{f} + b \quad \text{Formula 3}$$

Where k is a factor that is dependant on phase velocity and local conditions; d and f are depth to a particular boundary, and resonant frequency, respectively; and b is a calibration constant. The numerator of the above equation can be determined empirically by calibration with known subsurface geologic boundaries. A careful tie to a representative well log is normally useful for an area of many square miles. A depth accuracy of plus or minus 10 feet or better can be achieved depending on depth. For hydrocarbon exploration, the depth between about 0 feet to 30,000 feet is the range of most interest. For other materials, the depth can be much deeper. The measured electromagnetic waves are typically in the audio frequency range. Typically, k is between 10 to 35 million, and b is between plus or minus 2000.

FIGS. 1a also shows the first steps that may be employed for processing the data. A field measurement unit may comprise an antenna 200, an amplifier 202 and a tape deck 204. The field measurement may also have a processing unit, which may have an A/D conversion unit and disks for storing digital files for computer processing. The antenna 200 is used to pick up the electromagnetic waves from subsurface earth. The antenna 200 may consist of a number of turns of a fine wire on a metal core. Alternatively antenna 200 may include three orthogonal component antennas. The voltage picked up by antenna 200 is amplified by amplifier 202 and the output is passed to tape deck 204. The time domain data is collected for a predetermined period of time, for example, for five or more minutes. Several sets of time domain data may be collected. Data processing may start with A/D conversion. The sample rate that is selected depends on the need. In one embodiment, a rate of 48,000 samples per second is used. The digitized time-domain data is built into a data file. Several data files, typically 4 data files, each of 64,000 points, are built and stored on a disk for further computer processing. Complete data processing is possible at the field location or later at the office. A field unit may also comprise one or more band filters 290. A field unit may also comprise a processor 295.

In one embodiment, raw data are measured at the site of interest, i.e. the amplitudes and phase information of sub-harmonic waves. However, processing of raw data may be performed either in the field or back in a central office, or anywhere in between. In another embodiment, the collection of all raw data, whether they are sub-harmonic waves or not are done at the site of interest, but the gathering data of power line sub-harmonic waves may be done during the data processing in the office, i.e. power line sub-harmonic data are retained for further data processing and other data are rejected.

In the parent patent application, a shielding method was used to reduce unwanted electromagnetic noises from above ground sources. This method is cumbersome, especially in a mobile embodiment of the current invention. An alternative method for reducing noises is developed. In this embodiment, the antenna 200 is turned during the setup of a data acquisition session. The antenna 200 is turned to a direction that its response is minimum, or a null. In this manner the antenna does not receive most of the electromagnetic waves from other sources, such as radio stations, telephone transmitters, microwave transmitters. The only residue response of the antenna is due to the power line harmonics resonant waves from underground. A volt meter may be added in a measuring circuit to indicate when the null direction is reached. The search of the null direction with a volt meter maybe done manually or by an automated antenna.

The search of null direction to minimize unwanted electromagnetic energy can be done by mechanical device as discussed above. It may also be done based on data collected by multiple orthogonal antennas. The null maybe calculated as part of the data processing package when three orthogonal antennas are used in collecting the data. The horizontal null direction of the three antennas is used in a similar way as the read out of the volt meter. In addition, any angle found above the horizontal may contain some additional geologic information. This way, less mechanical operations are required in data collection.

The parent patent application describes a method of processing the data using power spectrum, which has been incorporated by reference. In this application, a second embodiment with a variation is described below. In this second embodiment, the raw data is filtered by a narrow time domain band filter. Narrow band filters have been widely used in the seismic data processing industry, for example, one particular filter that can be used in the current invention is similar to the one disclosed in Z. J. Nikolic's paper, cited in the reference section. The band width of the filter may be varied, depending on the frequency of interest. A typical band width for the filters used in the embodiments of the current invention is in the range of 0.25 Hz to about 3 Hz. It is approximately a quarter to one sixteenth of the distance in frequency domain between two neighboring frequencies used in the embodiments of the current invention. In each exploration, many frequencies in a frequency range are recorded. Depending on the depth of the region under investigation and the desired resolution, the distance between two neighboring frequencies could be selected as small as 1.875 Hz which is one thirty-second of the 60 Hz power line harmonics. The distance between the two neighboring frequencies could be much larger when those frequencies are high.

FIGS. 1b-1d illustrate some charts from data analysis using the embodiments of the current invention. The raw data may be filtered by a narrow band filter for the frequencies of interest.

FIG. 1b shows several amplitude-time charts for several frequencies after they are filtered through the narrow band filters. After going through the filters, the charts 222, 224, 226 and 228 are fairly smooth sine waves, with varying amplitudes and phases. Both the amplitudes and the relative phases between neighboring frequencies are used in further analysis.

The amplitude-time charts are converted to depth-time charts 232-238 in FIG. 1c. The frequency to depth conversion is done according to formula 3. The empirical factors are adopted based on the location of the exploration. Typically, the same factors may be used for a large area under study.

The amplitude-depth charts are further transformed into depth-features chart. There are many ways to present the amplitude-depth-phase information. FIG. 1d illustrates a simple presentation that can be used by an explorationist in determining the existence and location of materials of interest. In FIG. 1d, the features include the amplitude 244 and the pseudo-phase 242. The pseudo-phase is the phase difference between neighboring frequencies. For hydrocarbons, the Electromagnetic Hydrocarbon Indicator (EHI) 246 is shown. This EHI is a unique pattern related to the presentation of the electromagnetic waves which are collected by the embodiment of the current invention. For other materials of interest, or other presentation methods, other indicators may used.

When different analysis methods are used, the material indicator may be different. For example, in the parent application, the power spectrum method was used, and the EHI using the power spectrum is different from the EHI in this embodiment.

Figure 2:
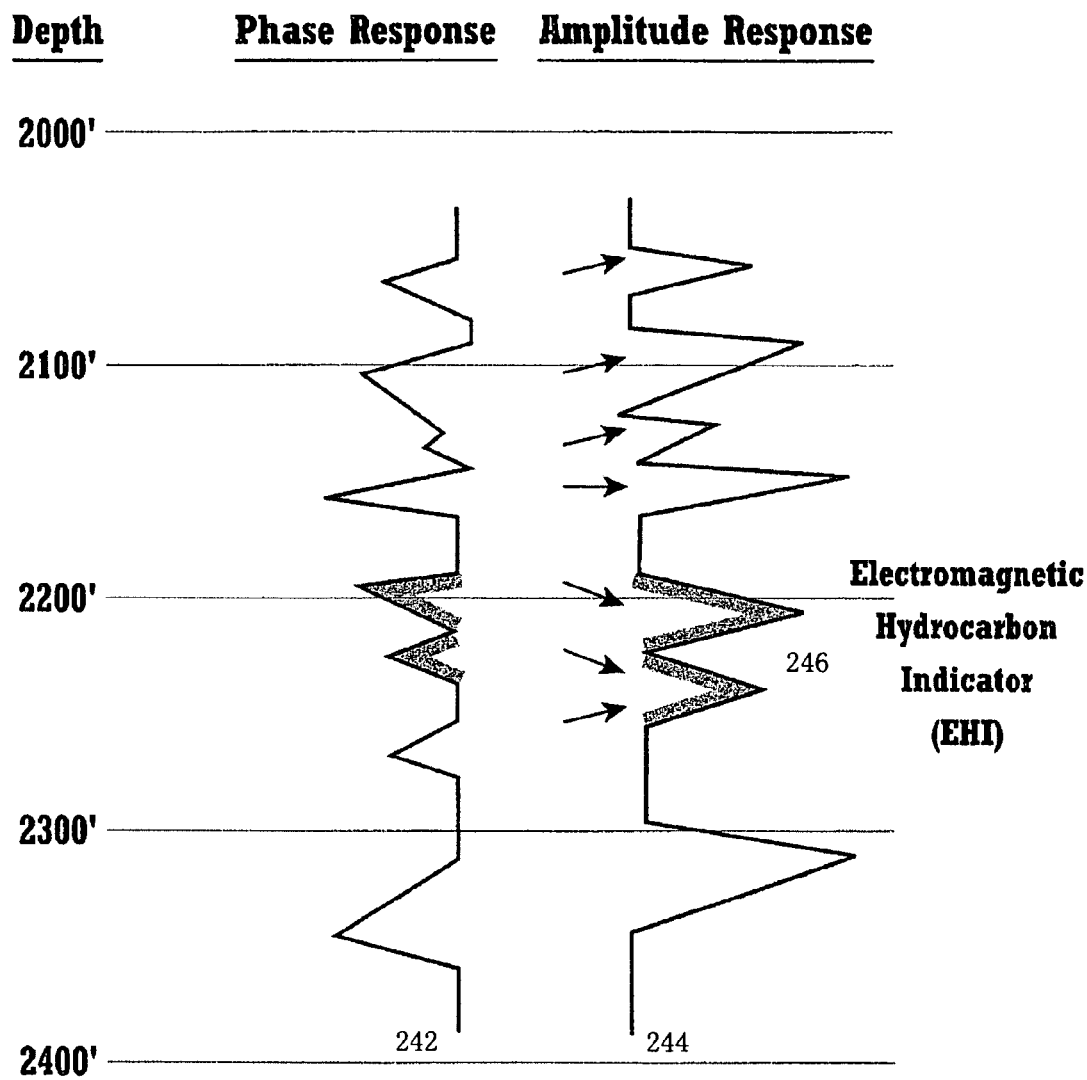
FIGS. 2-5 illustrates one presentation of data processed by one embodiment of the current invention and its comparison with results from other exploration methods.

FIG. 2 illustrates an enlarged WaveLog chart: according to one embodiment of the current invention. Two charts are depicted side-by-side, the phase response 242 and the amplitude response 244. The phase response chart depicted the relative phase changes between neighboring frequencies as shown in FIG. 1c. When there is little or no phase change, the amplitude of the phase response chart is relatively flat. When there is a large phase change, there will be a peak on the phase chart, illustrated as a peak to the left. On the other hand, the amplitude response illustrates the amplitude of the wave for the particular frequency as shown in FIG. 1c. When putting the phase response 242 and amplitude response 244 together as shown in FIG. 2, the relative magnitude and position of the peaks in the phase response and amplitude response are fairly clear. The size, sequence and relative locations of the peaks in both phase response and amplitude response unique to certain underground features may be identified. In one embodiment, hydrocarbon is the main feature of interest. It is found that when hydrocarbon, which is a good fluid resistor, is present underground, a phase peak typically precedes the amplitude peak. In FIG. 2, as indicated by the shadow area of the two charts, Electromagnetic-Hydrocarbon Indicator (EHI) 246 is found at the depth from about 2190 feet through 2250 feet.

Figure 3:
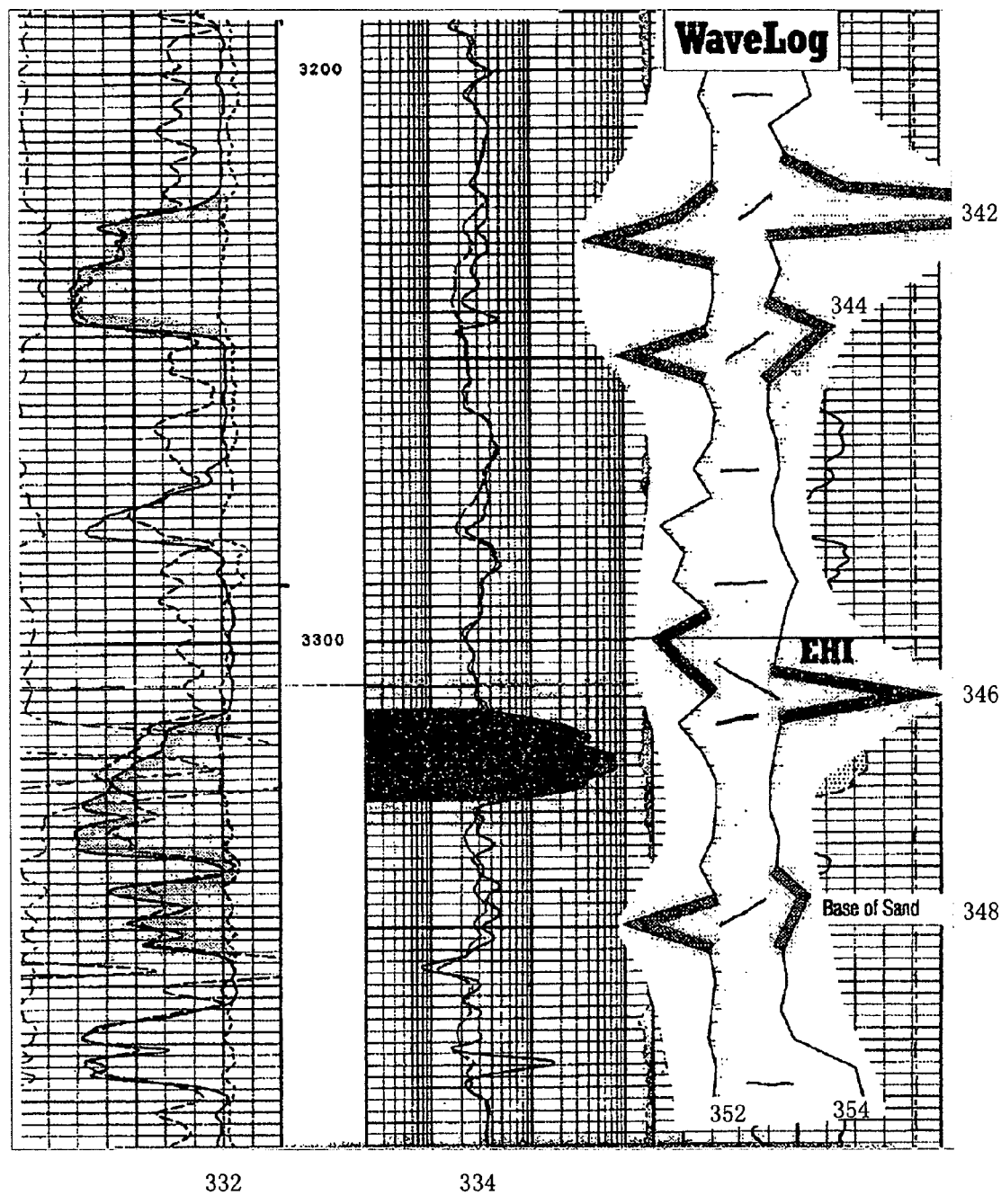

FIG. 3 shows a WaveLog and the interpretation that was made prior to the drilling of a well in Texas. For better comparison, the electrical logs 332 and 334 obtained after the drilling and the WaveLog 352 & 354 obtained before the drilling are shown side by side. The WaveLog consists of two charts, the phase response 352 and the amplitude response 354. A unique EHI 346 can be located on the WaveLog. The pre-drill interpretation indicated an 18 foot thick hydrocarbon zone 346 from about 3296 feet to 3314 feet. When the well was drilled, 16 feet of gas filled sand at a depth from 3312 to 3328 feet was found. The depth prediction in this example is within 16 feet and this is well within the accuracy of other hydrocarbon prediction methods currently used in the oil and gas industry.

The same chart also indicated that there were two sand layers. The first sand layer is between sand layer top boundary 342 and sand layer bottom boundary 344. The first sand layer top boundary 342 is at a depth about 3216-3234 feet. The first sand layer bottom boundary 344 is at about 3240-3256 feet. Both of the top and bottom boundaries of the first layer indicate that only salt water is present. The second sand layer is between a top boundary 346 and a bottom boundary 348. A hydrocarbon layer 346 is between 3340 to 3354 feet. That is the sand near the top of the second sand layer contains hydrocarbon. The second sand layer bottom boundary 348 is at about 3340-3354 feet. The sand near the second sand layer bottom 348 contains only salt water. The prediction errors for these features are comparable to other hydrocarbon prediction techniques.

Figure 4:
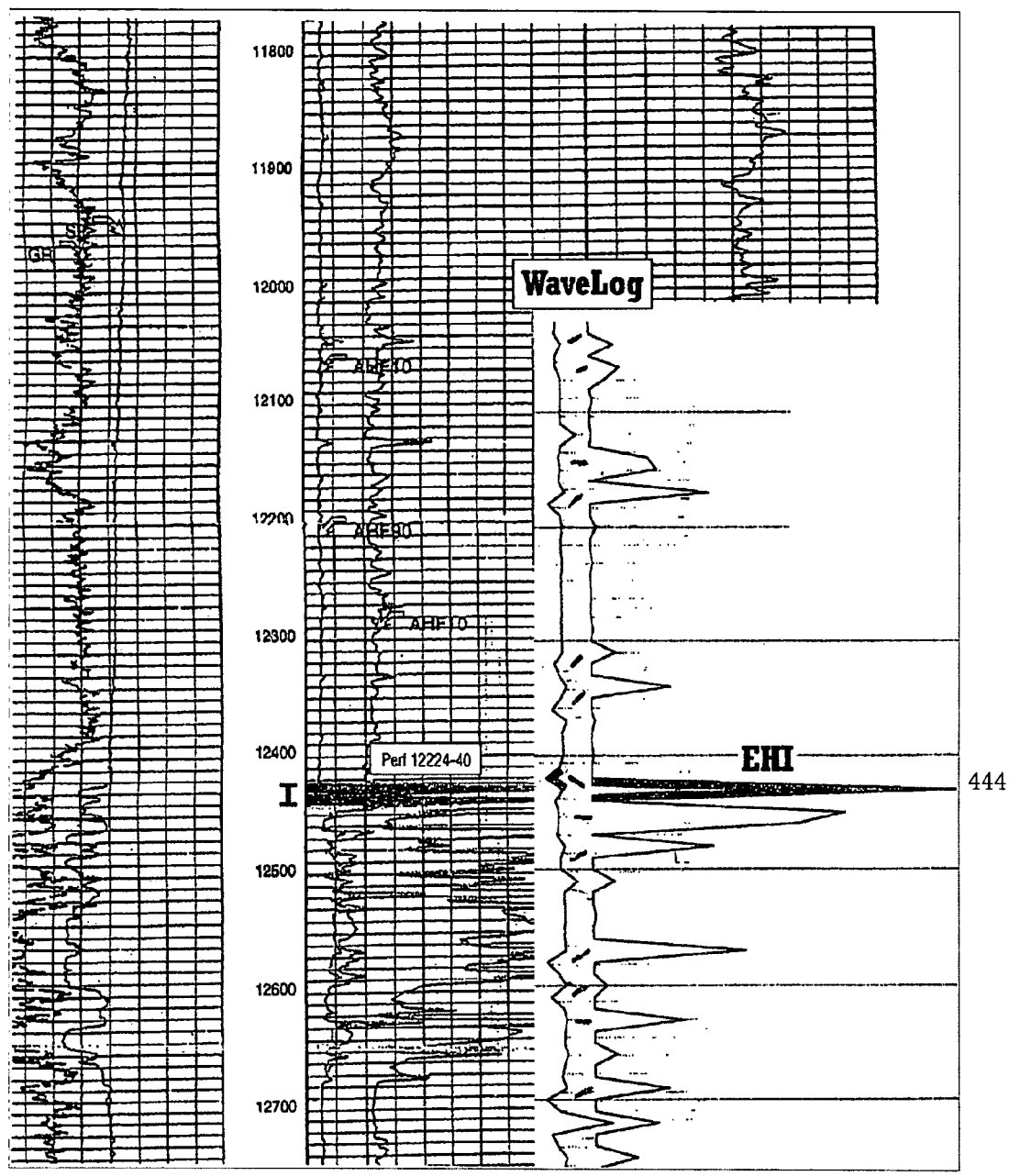

FIG. 4 illustrates another application of the current invention at a much deeper depth. The pre-drill interpretation was made for a well in Southwestern Louisiana. The WaveLog interpretation indicated a 20 foot thick EHI 444 at a depth of 12,410 feet. In this particular well a 15 foot gas zone at 12,420 feet was encountered. The prediction error is still within 20 feet.

Figure 5:
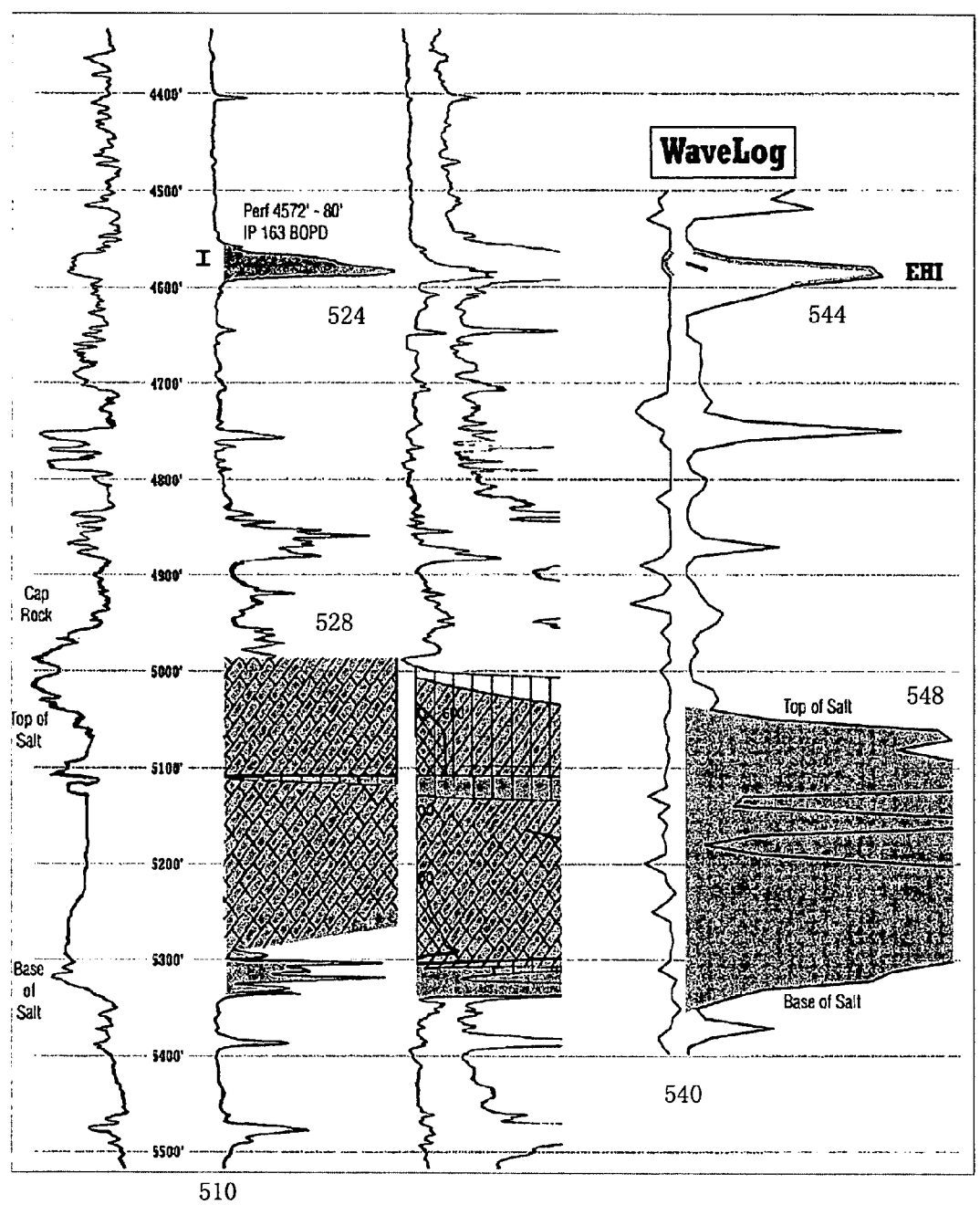

FIG. 5 illustrates the electric log 510 and the corresponding WaveLog 540 for a well that was drilled through a salt overhang on the Brookshire Dome in Waller country Texas. The indication at this wellsite shows the oil sand at a depth of 4570 feet, as well as the top and the bottom of the salt. The hydrocarbon layer is indicated by the peak 524 on the electric log and the EHI 544 on the WaveLog. The salt layer is indicated by 528 on the electric log and 548 on the wave-log. This example demonstrates that the methods in the current invention can be used to image the base of a salt layer, which is very difficult to detect using existing methods.

The unique indicators for different underground features in the embodiments of the current invention can be use in many applications. For example, the EHI for hydrocarbon may also be used to identify shallow underground oil spills due to underground fuel tank leakage and underground pipeline leakage, which can be very helpful in environmental surveys and remediation.

There are many advantages of the present invention as compared to prior art methods for investigation of subsurface earth formations and geological features. The use of a free and omnipresent electromagnetic source greatly simplifies data acquisition. The power line grid, and the secondary harmonics that are induced into the earth, are universally present and reasonably constant in amplitude. This source provides an abundance of known frequencies each of which has the opportunity to tune with a subsurface boundary. The resonant waves are stable and can be reliably measured repeatedly to improve signal to noise ratio. The resonant waves are insensitive to the altitude where the measurements are taken. The instrument can be on board a truck, in a trailer, in a boat or submarine, or in an aircraft, a balloon or a satellite, such that the instrument can be very mobile. When the measuring instruments are on board an aircraft, they can be taken to areas that are not very accessible in other forms of transportation. The measurement can be taken with a minimum cost and covering a large area. When necessary, more measurements can be taken at the same site to ensure accurate data acquisition, adequate quantity of data and a more thorough investigation.

The embodiments of current invention are to discover and locate the boundaries of underground layers of different materials due to their unique electromagnetic properties. Those different materials can be of many different properties and formations, such as hydrocarbon deposits, water, salt and various rock types, minerals, cavities, and others. They can be used for many different purposes, outside the oil exploration industry. For example, they can be used to locate underground archeological structures, natural caves or man-made tunnels and bunkers.

While illustrative embodiments of the invention have been illustrated and described, it will be appreciated that various changes can be made therein without departing from the spirit and scope of the invention.

We claim:

1. A method of determining a geological feature comprising:
    (a) detecting a plurality of electromagnetic waves in the earth, wherein the plurality of electromagnetic waves are:
        induced in the earth by a power grid;
        in resonance with geological boundaries within the earth; and
        multiples of sub-harmonics of a power grid frequency;
    (b) determining a frequency amplitude of each of the plurality of electromagnetic waves;
    (c) for one or more of the plurality of electromagnetic waves determining a depth of a geological boundary using the formula: $d=(k/f)+b$, where d is the depth in feet, f is the frequency in Hz, and k is dependant on a phase velocity of the electromagnetic wave and b is a calibration constant; and
    (d) generating a wave log of phase response and amplitude response of the plurality of electromagnetic waves wherein the relationship between the phase response and amplitude response is indicative of the presence of a geological feature.

2. The method of claim 1, wherein determining a frequency of the plurality of electromagnetic waves comprises filtering the plurality of electromagnetic waves through a plurality of narrow-band filters having a central frequency and a bandwidth.

3. The method of claim 2, wherein at least one of the narrow-band filters has a bandwidth of 0.25 Hz to 3 Hz.

4. The method of claim 1, wherein k is between about $10 \times 10^6$ and about $35 \times 10^6$.

5. The method of claim 1, wherein the geological feature is hydrocarbons, water, minerals, or a cavity at the geological boundary.

* * * * *